United States Patent [19]

Nilssen

[11] Patent Number: 4,644,228
[45] Date of Patent: Feb. 17, 1987

[54] SERIES-RESONANT PARALLEL-LOADED FLUORESCENT LAMP BALLAST

[76] Inventor: Ole K. Nilssen, Caesar Dr. Rte. 5, Barrington, Ill. 60010

[21] Appl. No.: 691,171

[22] Filed: Jan. 14, 1985

[51] Int. Cl.[4] .................. H05B 37/00; H05B 39/00; H05B 41/14
[52] U.S. Cl. .................. 315/242; 315/DIG. 7; 315/241 R; 315/244; 361/113; 361/71; 363/50
[58] Field of Search .......... 315/DIG. 7, 241 R, 242, 315/243, 244, 101, 127; 361/15, 17, 54, 55, 113, 91; 363/16, 17, 28, 50

[56] References Cited

U.S. PATENT DOCUMENTS

| | | | |
|---|---|---|---|
| 4,259,614 | 3/1981 | Kohler | 315/DIG. 7 |
| 4,392,087 | 7/1983 | Zansky | 315/225 |
| 4,398,126 | 8/1983 | Zuchtriegel | 315/127 |
| 4,406,976 | 9/1983 | Wisbey et al. | 315/244 |
| 4,413,313 | 11/1983 | Robinson | 363/16 |
| 4,503,363 | 3/1985 | Nilssen | 315/DIG. 7 |
| 4,554,487 | 11/1985 | Nilssen | 315/225 |

Primary Examiner—Saxfield Chatmon

[57] ABSTRACT

A source of high-frequency voltage is applied directly across a series-resonant L-C circuit. A fluorescent lamp and a Varistor are both connected in parallel with the capacitor of this L-C circuit. The Varistor is operative: (i) to prevent the series-resonant L-C circuit from ever overloading the voltage source, and (ii) to limit the magnitude of the voltage provided across the lamp to a level appropriate for rapid-starting thereof. When power is initially applied, the lamp's cathodes are cold and the lamp does not conduct; which implies that a significant amount of power is dissipated in the Varistor. For sake of cost-effectiveness and energy conservatiion, if the lamp fails to conduct for about 25 milli-seconds, a control means provides a short circuit across the capacitor. The resulting short circuit current is used for heating the fluorescent lamp cathodes. After about 1.5 second, the short circuit is removed for about 25 milli-seconds, thereby permitting the voltage across the capacitor to grow to an magnitude sufficient to ignite and operate the lamp. If lamp current does not then flow, or if at any time it ceases to flow, the short circuit will be re-applied within about 25 milli-seconds. Thereafter, until power is removed or until an operable lamp is connected, the control means will continuously repeat the cycle of 1.5 second short circuit and 25 milli-seconds open circuit.

15 Claims, 1 Drawing Figure

SERIES-RESONANT PARALLEL-LOADED FLUORESCENT LAMP BALLAST

BACKGROUND OF THE INVENTION

1. Field of Invention

The present invention relates to series-excited parallel-loaded resonant ballasts for fluorescent lamps.

2. Prior Art

Series-excited parallel-loaded resonant fluorescent lamp ballasts have been previously described, such as in U.S. Pat. Nos. 3,710,177 to Ward and 4,370,600 to Zansky. However, these previously described ballasts do not provide solutions to several basic problems associated with practical applications of such ballasts. These problems relate to the excessive power drain by and the self-destructive nature of the series-excited parallel-loaded resonant ballast under the condition of being unloaded.

BACKGROUND CONSIDERATIONS

In powering a fluorescent lamp by way of a series-resonant ballast, where the ballast constitutes a high-Q resonant L-C circuit series-excited from an AC voltage source and parallel-loaded by the fluorescent lamp, there is a problem associated with the situation where the fluorescent lamp for one reason or another does not constitute an effective load for this high-Q series-excited L-C circuit. In such a situation, which occurs each time the lamp is started (before the cathodes have reached incandescence), but which otherwise is most apt to occur toward end of normal lamp life, the power drawn by the high-Q resonant L-C circuit from its AC voltage source is so excessively high as to cause damage to or even destruction of the L-C circuit and/or the AC voltage source. If, contrary to expectations, destruction of the circuit and/or the source does not occur, the amount of power drawn from the source will be so large as to represent an unacceptable level of energy waste—recognizing that it may take a long time before a worn-out lamp is replaced.

SUMMARY OF THE INVENTION

Objects of the Invention

An object of the present invention is that of providing safe, reliable and efficient ballasts for fluorescent lamps.

This as well as other important objects and advantages will become apparent from the following description.

BRIEF DESCRIPTION

An L-C circuit with an unloaded Q-factor of about 50 is series-connected directly across the output of a 100 Volt/30 kHz voltage source. This L-C circuit is resonant at 30 kHz, which means that it is resonant at the very frequency of the voltage source.

A regular F40/T12 40 Watt fluorescent lamp and a Varistor voltage-limiting means are both connected in parallel with the tank-capacitor of the L-C circuit, the Varistor being operative to limit the voltage developed across the tank-capacitor to a magnitude suitable for proper lamp starting, which magnitude is about 300 Volt.

Without the voltage-limiting means, with an unloaded Q-factor of 50 and linear circuit operation, the magnitude of the voltage developing across the tank-capacitor would have been 5000 Volt.

Under normal operation, the fluorescent lamp limits the magnitude of the voltage developing across the tank-capacitor to about 100 Volt; and at that point the loaded L-C circuit draws approximately 40 Watt of power from the source. Thus, with a loaded Q-factor of about unity and an unloaded Q-factor of 50, the implication is that, under normal operation, the losses in the L-C circuit amount to about 2% of the total power drawn from the source.

If for some reason the fluorescent lamp should fail to constitute an effective load for the L-C circuit, the magnitude of the voltage across the tank-capacitor would increase to about 300 Volt, which implies that the power drawn from the source at that point would be about 120 Watt, with substantially all of it being dissipated in the Varistor.

If there were no Varistor present, however, the power drawn by the L-C circuit from the source—assuming no breakdown—would be about 2000 Watt, with all of it being dissipated within the L-C circuit itself.

The present invention provides for means to prevent the L-C circuit from operating in its resonant mode—and thereby to prevent it from drawing excessive power—in case the fluorescent lamp should fail even for a brief period to constitute a proper load for the L-C circuit. This effect is accomplished by a transistor operative, by way of a rectifier bridge, to provide a short circuit across the tank-capacitor whenever lamp current fails to flow for about 25 milli-seconds. With a short-circuited tank-capacitor, the amount of power drawn by the L-C circuit is negligibly small.

More particularly, a control means is connected with the the L-C circuit and is operative as follows.

When the circuit is initially powered, the fluorescent lamp is inoperative (since its cathodes are not yet thermionic) and the Varistor absorbs all the power provided to the circuit. By a small first transformer means, the current flowing through the Varistor is sensed and used for charging a first capacitor. After about 25 milli-seconds, the voltage on this first capacitor reaches a magnitude large enough to cause breakdown of a first Diac connected thereto. The resulting trigger pulse is then used, by way of a rectifier bridge and a transistor, for momentarily causing a short circuit across the tank-capacitor; and, with a second small transformer means, the resulting short circuit current is sensed and used for maintaining the short circuit.

The second transformer means is also used to provide cathode heating power for the fluorescent lamp, as well as for charging a second capacitor. After about 1.5 second, by which time the cathodes are fully thermionic, this second capacitor reaches a voltage large enough to cause a second Diac to break down and to cause a momentary disruption of the short circuit. This momentary disruption is operative to stop the short circuit current from flowing long enough to dissolve the short circuit condition indefinitely—except to the extent that it may be re-established if current were again to flow through the Varistor.

With the lamp cathodes fully thermionic, the lamp ignites within a few milli-seconds after removal of the short circuit; and, of course, after the lamp has ignited and is properly operating, there will be no current flowing through the Varistor, and the short circuit will therefore not be re-established.

However, if the lamp were to be removed, or if the lamp otherwise should fail to constitute an adequate load for the L-C circuit, Varistor current will flow; and the short circuit will then be re-established within about 25 milli-seconds.

Thus, with no lamp load connected, the control means tries every 1.5 second or so to start the lamp by removing the short circuit for a period of about 25 milli-seconds. With a duty-cycle of about 25 milli-seconds out of 1500 milli-seconds (1.67%), the average power absorbed by the L-C circuit will be only about 2.0 Watt, most of which is actually dissipated in the Varistor.

DESCRIPTION OF THE PREFERRED EMBODIMENT

Details of Construction

Figure 1:
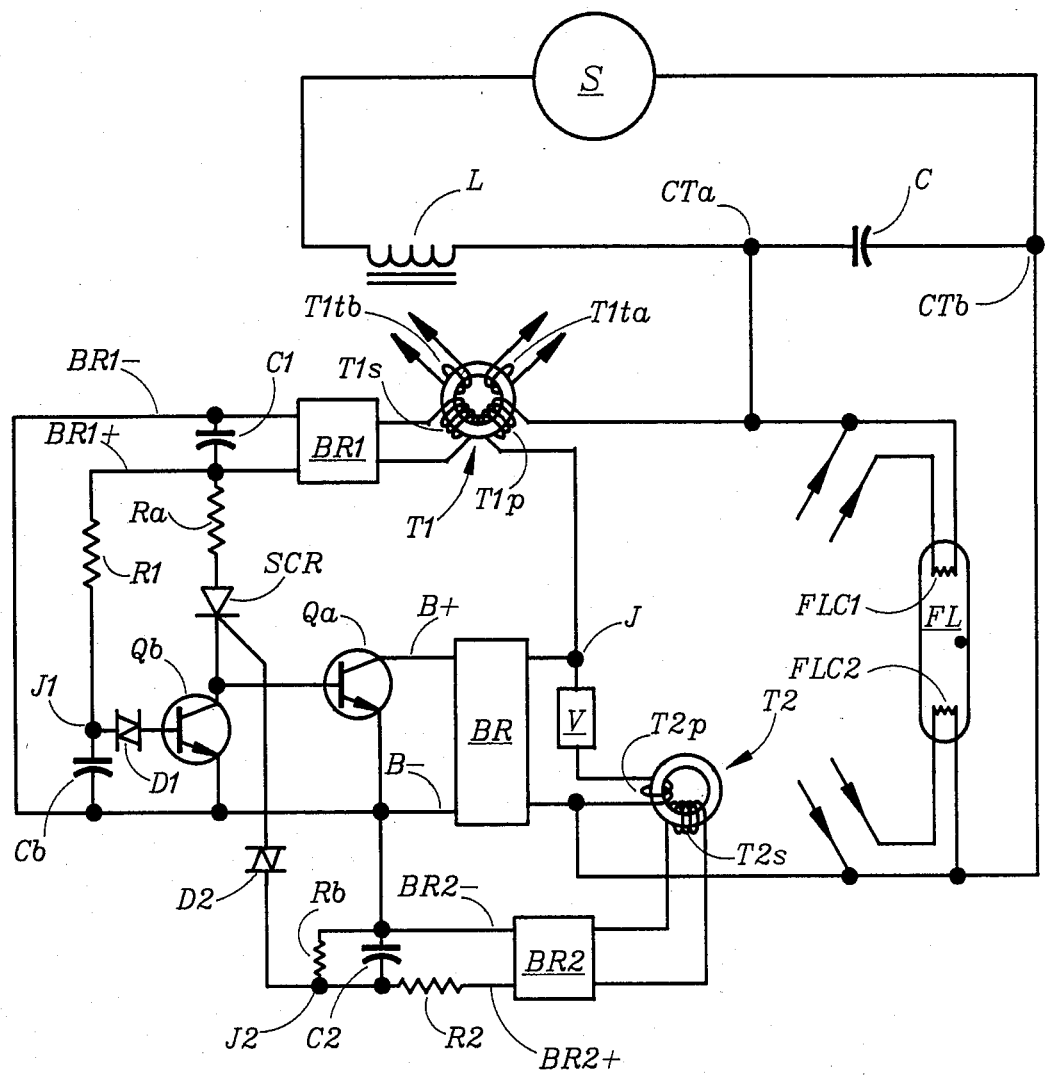
FIG. 1 provides a schematic circuit diagram of the preferred embodiment of the invention.

FIG. 1 shows an AC voltage source S, which in reality is a power-line-operated frequency converter providing an output voltage of 100 Volt RMS magnitude and 30 kHz frequency.

Connected directly across S is a series-combination of an inductor L and a capacitor C. Capacitor C has capacitor terminals CTa and CTb.

A fluorescent lamp FL, having cathodes FLC1 and FLC2, is connected directly between capacitor terminals CTa and CTb.

Primary winding T1p of a current transformer T1 is connected between capacitor terminal CTa and a junction J.

A Varistor V is connected in series with the primary winding T2p of a current transformer T2;, and this series-combination is connected directly between junction J and capacitor terminal CTb.

A bridge rectifier BR, having a B+ output bus terminal and a B− output bus terminal, is also connected between junction J and capacitor terminals CTb.

A transistor Qa is connected with its collector to the B+ bus and with its emitter to the B− bus.

A bridge rectifier BR1 is connected with secondary winding T1s of transformer T1; which rectifier has negative and positive output terminals BR1− and BR1+, respectively. A capacitor C1 is connected directly between output terminals BR1− and BR1+.

The negative output terminal BR1− is connected with the B− bus; the positive output terminal BR1+ is connected to one terminal of a resistor R1, the other terminal of which is connected with junction J1.

A capacitor Cb is connected between junction J1 and the B− bus. A Diac D1 is connected between junction J1 and the base of a transistor Qb. The collector and the emitter of transistor Qb are connected with the base of transistor Qa and the B− bus, respectively.

Connected between terminal BR1+ and the base of transistor Qa is a series combination of a resistor Ra and a thyristor SCR, with the anode of SCR being connected with the resistor and the cathode of SCR being connected with base of Qa.

A bridge rectifier BR2 is connected with secondary winding T2s of transformer T2; which rectifier has negative and positive output terminals BR2− and BR2+, respectively. Terminal BR2− is connected with the B− bus. A resistor R2 is connected between the BR2+ terminal and a junction J2.

A capacitor C2 and a resistor Rb are connected in parallel, and this parallel-combination is connected between junction J2 and the B− bus. A Diac D2 is connected between junction J2 and the gate of thyristor SCR.

Transformer T1 has a first tertiary winding T1ta connected with cathode FLC1 of fluorescent lamp FL, and a secondary tertiary winding T1tb connected with fluorescent lamp cathode FLC2.

Details of Operation

In FIG. 1, when the 100 Volt/30 kHz voltage from source S is initially applied to the L-C series-circuit, a voltage is developed across capacitor C. The magnitude of this voltage rises to the point where the Varistor provides voltage-limiting; which point, to provide for proper lamp starting voltage, is selected by choice of Varistor to be about 300 Volt. The current flowing through the Varistor also flows through the primary winding of current transformer T2, which then gives rise to a DC output to charge capacitor C2 to about 30 Volt in 25 milli-seconds or so. At about 30 Volt, Diac D2 breaks down and provides a pulse to trigger thyristor SCR.

The current flowing through the Varistor also flows through the primary of transformer T1, thereby providing heating power for the fluorescent lamp cathodes, as well as a DC voltage at the output of rectifier BR1. Thus, from the moment that the thyristor is triggered into conduction, unidirectional current starts flowing from rectifier BR1 and into the base of transistor Qa, thereby causing transistor Qa to conduct and to provide an effective short circuit between junction J and terminal CTb. The value of resistor Ra is chosen such that the amount of current flowing into the base of Qa is just adequate to provide for an effective short circuit.

As long as transistor Qa provides for a short circuit, current will continue to flow through the primary winding of transformer T1; which means that the short circuit will remain in effect until the base current provided to Qa is interrupted.

The DC output voltage of BR1 is also used for charging capacitor Cb by way of resitor R1. After about 1.5 second, the voltage on Cb reaches a magnitude high enough for for Diac D1 to break down, at which point the charge on capacitor Cb will flow into the base of transistor Qb, thereby causing Qb to conduct heavily enough to shunt away the base current of Qa. At this point, Qa is rendered non-conductive, which means that the short circuit between junction J and terminal CTb is broken.

With the short circuit removed, the voltage across tank-capacitor C will rise until limited by the effective load presented to the L-C circuit. Before the lamp ignites, this effective load is constituted by the Varistor. However, as long as the fluorescent lamp is in place and operable, and since its cathodes are now fully incandescent, the Varistor will only represent the effective load for a few milli-seconds—until the fluorescent lamp ignites.

After the lamp has ignited, no current will flow through either of the transformer primaries; which means that the short circuit can not be re-established as long as the lamp operates in normal fashion.

After current through the T1p winding ceases to flow, cathode heating power will no longer be provided by the tertiary windings T1ta and T1tb. For most fluorescent lamps, it is not necessary for cathode power to be provided after the lamp has ignited. On the contrary, by removing cathode power after the lamp has ignited, significant energy savings result.

If at any time current through the lamp ceases to flow, as would happen if the lamp were removed, the Varistor again takes over as the main load on the L-C circuit. And, within about 25 milli-seconds, capacitor C2 charges up to the point of causing breakdown of Diac D2. This breakdown initiates the short circuit between junction J and terminal CTb, which short circuit will now remain in effect for about 1.5 second; whereafter the same cycle will be repeated indefinitely—until power is removed or until a functional lamp is connected.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

What is claimed is:

1. A ballast for a gas discharge lamp, said ballast being adapted to operate from a source of periodic AC voltage and comprising:
    an L-C circuit series-connected across said source, said L-C circuit being resonant at or near the frequency of said AC voltage and having at least one inductive and one capacitive reactance means;
    voltage-limiting means connected in parallel-circuit with one of said reactance means;
    connect means operable to connect said lamp in parallel-circuit with one of said reactance means, thereby to provide for proper lamp starting and operating voltage; and
    shorting means effectively connected in circuit with said one of said reactance means and operative, but only after current has been flowing through said voltage-limiting means for a pre-determined first period, to cause a short circuit effectively to be provided across said one of said reactance means.

2. The ballast of claim 1 and means whereby said short circuit is removed after a pre-determined second period.

3. The ballast of claim 2 wherein the duration of said first period is substantially longer than the duration of one full period of said AC voltage.

4. The ballast of claim 2 wherein the duration of said second period is substantially longer than that of said first period.

5. The ballast of claim 1 wherein said lamp has thermionic cathodes and wherein means are provided by which these cathodes receive heating power as long as said short circuit is being provided.

6. The ballast of claim 1 wherein said voltage-limiting means comprises non-linear resistance means.

7. The ballast of claim 1 wherein said shorting means comprises rectifier means and transistors means.

8. The ballast of claim 1 wherein the frequency of said AC voltage is substantially higher than that of the voltage normally present on an ordinary electric utility power line.

9. A ballast for a gas discharge lamp, said ballast being adapted to operate from a source of high-frequency periodic AC voltage and comprising:
    an L-C circuit series-connected across said source, said L-C circuit being series-resonant at or near the frequency of said AC voltage and having at least one inductive and one capacitive reactance means;
    voltage-limiting means connected in parallel with one of said reactance means;
    connect means operable to connect said lamp in parallel-circuit with said one of said reactance means, thereby to provide for proper lamp starting and operating voltage; and
    shorting means connected in circuit with the voltage-limiting means and responsive to current flowing therethrough, said shorting means being operative, but only when there is no current flowing through the lamp, to effectively cause an intermittently interrupted short circuit across said one of said reactance means.

10. A ballast for a gas discharge lamp, said ballast being adapted to operate from a source of periodic high-frequency AC voltage and comprising:
    an L-C circuit series-connected across said source, said L-C circuit being series-resonant at or near the frequency of said AC voltage and having at least one inductive and one capacitive reactance means;
    voltage-limiting means connected in parallel-circuit with one of said reactance means;
    connect means operable to connect said lamp in parallel-circuit with said one of said reactance means, thereby to provide for proper lamp starting and operating voltage; and
    shorting means effectively connected in circuit with said one of said reactance means and responsive to current flowing through said voltage-limiting means, said shorting means being effectively operative to provide an intermittently interrupted short circuit across said one of said reactance means, but only as long as said lamp is non-connected or otherwise non-operative to provide a load for said L-C circuit.

11. The ballast of claim 10 further characterized as being operative to prevent said shorting means from providing said short circuit whenever said lamp is properly operating.

12. The ballast of claim 11 wherein said voltage-limiting means comprises non-linear resistance means.

13. An arrangement comprising:
    a source of periodic high-frequency AC voltage;
    an L-C circuit series-connected across said source, said L-C circuit being resonant at or near the frequency of said AC voltage and having at least one inductive and one capacitive reactance means;
    voltage-limiting means connected in parallel-circuit with one of said reactance means;
    a gas discharge lamp connected in parallel with said one of said reactance means; and
    shorting means operative, in response to current flowing therethrough and/or through the voltage-limiting means, but only when substantially no current flows through the lamp, to effectively provide an intermittently interrupted short circuit across said one of said reactance means.

14. A ballast for a gas discharge lamp, said ballast being adapted to operate from a source of periodic high-frequency AC voltage and comprising:
    an L-C circuit adapted to series-connect across said source, said L-C circuit being resonant at or near the frequency of said AC voltage and having at least one inductive and one capacitive reactance means;
    voltage-limiting means connected in parallel-circuit with one of said reactance means;

connect means operative to permit connection of said lamp in parallel-circuit with said one of said reactance means; and shorting means responsive to current flowing through said voltage-limiting means and operative to effectively provide an intermittently interrupted short circuit across said one of said reactance means.

15. The ballast of claim 14 wherein said lamp has a thermionic cathode and wherein heating power is provided to said cathode as long as a lamp is connected with said connect means, but only as long as substantially no current is flowing through the lamp.

* * * * *